J. D. MEGOWN.
CAMERA BACK.
APPLICATION FILED APR. 25, 1913.
1,104,527.
Patented July 21, 1914.
2 SHEETS—SHEET 1.
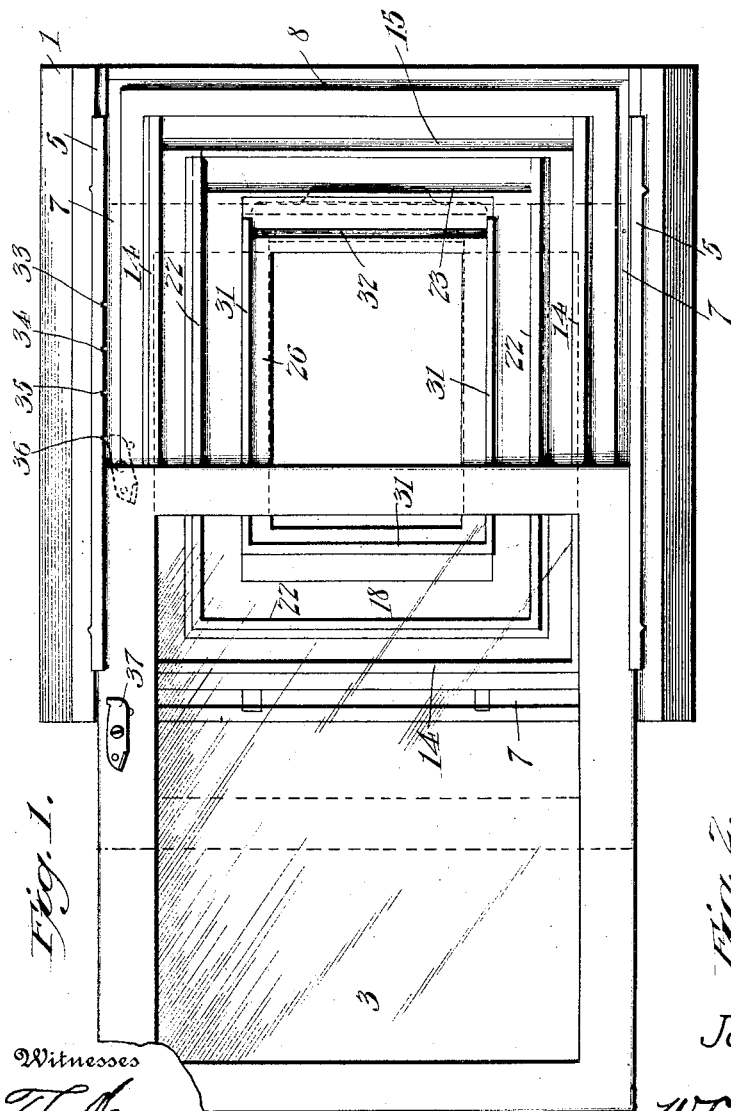
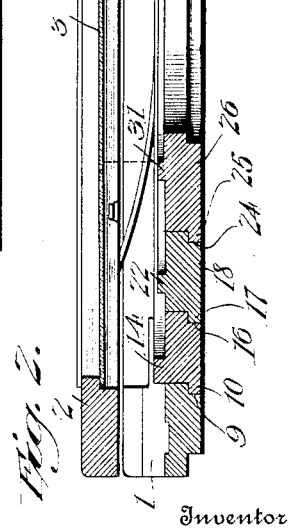
Inventor
John D. Megown
By W. C. Carman
His Attorney
Witnesses J. D. MEGOWN.
CAMERA BACK.
APPLICATION FILED APR. 25, 1913.
1,104,527.
Patented July 21, 1914.
2 SHEETS—SHEET 2.
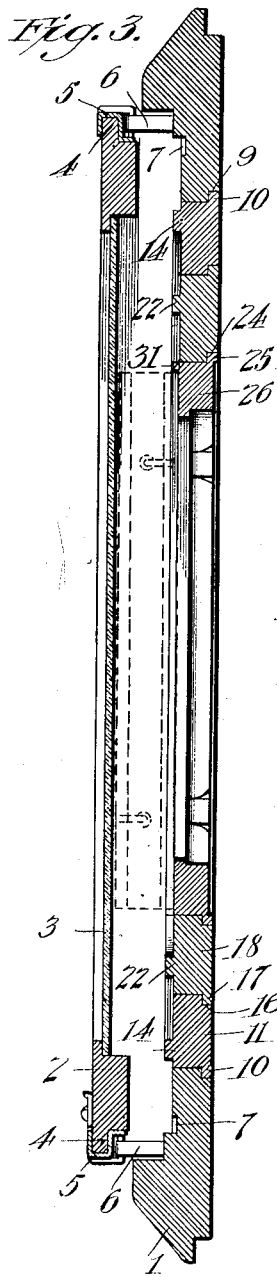
Fig. 3.
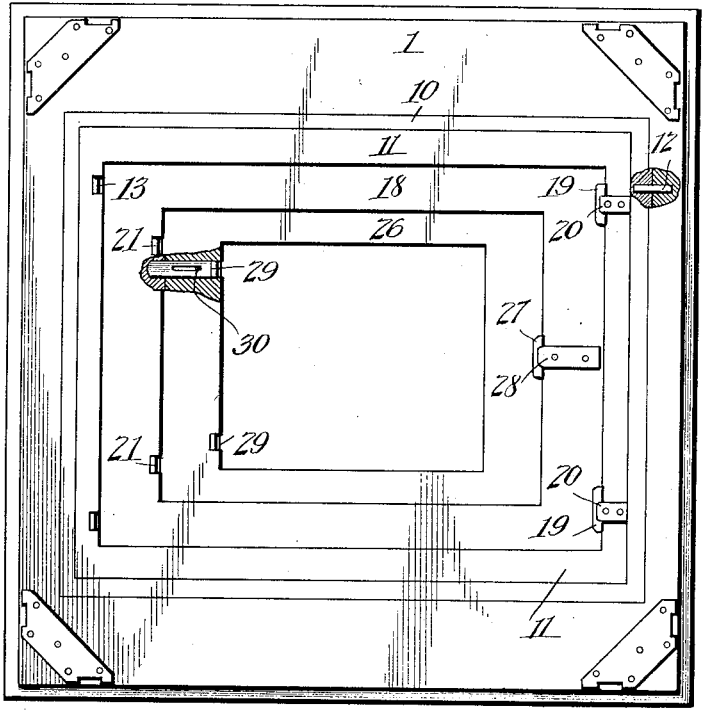
Fig. 4.
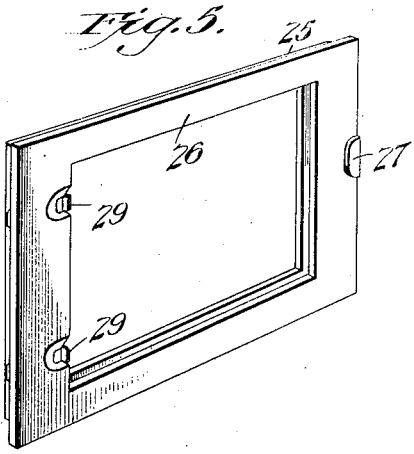
Fig. 5.
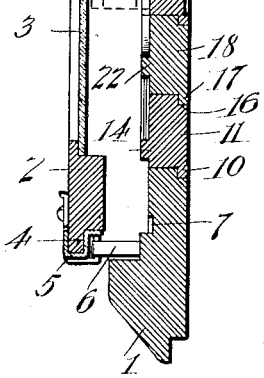
Witnesses
Inventor
John D. Megown
By W. C. Carman
His Attorney

UNITED STATES PATENT OFFICE.

JOHN D. MEGOWN, OF YOUNGSTOWN, OHIO.

CAMERA-BACK.

1,104,527.   Specification of Letters Patent.   Patented July 21, 1914.

Application filed April 25, 1913. Serial No. 763,669.

*To all whom it may concern:*

Be it known that I, JOHN D. MEGOWN, a citizen of the United States, residing at Youngstown, in the county of Mahoning and State of Ohio, have invented certain new and useful Improvements in Camera-Backs, of which the following is a specification.

The present invention relates to certain new and useful improvements in the construction of camera backs such are adapted to be employed in connection with plate holders or film packs, the object of the invention being to provide a camera back which embodies novel features of construction whereby proper adjustment can be readily made to accommodate different sizes of plate holders or film packs as may be desired.

A further object of the invention is to provide a camera back which is formed with a series of nested frames which may be quickly assembled or removed as may be necessary to adapt the camera back for use in connection with the various sizes of plate holders and film packs.

A further object of the invention is to provide an adaptable camera back which can be readily applied to any conventional form of camera, which can be quickly adjusted to receive any of the various sizes of plate holders or film packs, and which does not interfere in any manner with the focusing or adjustment of the camera.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a rear elevation of the adaptable camera back showing the nested frames or sections as assembled to receive a small size of plate holder or film pack, the ground glass frame being partially removed and a plate holder being shown by dotted lines in the position assumed when it is about to be inserted in the camera back. Fig. 2 is a longitudinal sectional view through the camera back, a plate holder being shown in position by dotted lines. Fig. 3 is a transverse sectional view through the camera back, a plate holder being shown in position by dotted lines. Fig. 4 is an elevation of the inner face of the camera back, all of the frames being assembled to admit of the camera back being employed in connection with a small size of plate holder, and portions being broken away to show one of the locking slides of the nested frames, and Fig. 5 is a detail perspective view of the smaller nested frame.

Corresponding and like parts are referred to in the following description and indicated in all the views of the drawings by the same reference characters.

Specifically describing the present embodiment of the invention, the numeral 1 designates the main frame of the camera back which is adapted to be fitted to the rear of an ordinary camera in any suitable manner. A ground glass frame 2 is yieldably mounted at the rear of the main frame of the camera back and is adapted to serve in the usual manner as a clamping member to hold the plate holder in position against the camera back while an exposure is being made. The usual ground glass 3 is fitted within the ground glass frame 2, and the longitudinal edges of the said ground glass frame are formed with flanges 4 which are slidably received within channel bars 5 which are yieldably connected to the main frame 1 of the camera back by the conventional springs 6. When the plate holder is not in position, the springs 6 hold the ground glass frame 2 closely against the main frame 1 so that the camera can be focused in the usual manner, and when the plate holder is inserted in position the ground glass frame acts as a clamping member to hold the same firmly in position while the exposure is being made.

The main frame 1 is of such a size as to accommodate the largest size of plate holder or film pack which can be used in connection with the camera. In the present instance it may be assumed that the main frame 1 is of such a size as to accommodate an 8x10 plate holder, the back of the main frame 1 being provided upon three sides thereof with a groove 7 adapted to receive felt or other suitable material to fit against the sides of the 8x10 plate holder and provide a light proof joint. The fourth side of the main frame 1 is provided with the usual depression or groove 8 adapted to receive the rib at the outer end of the plate holder.

The opening of the main frame 1 is rabbeted at the inner face thereof as indicated at 9 so as to receive a flange 10 of a frame 11 which is adapted to be detachably fitted within the main frame 1. One end of this removable frame 11 is provided with the positioning pins 12 which are adapted to engage corresponding sockets in the main frame 1, while the opposite end of the removable frame 11 is provided with a pair of sliding latches 13 which can be moved into and out of engagement with suitable recesses in the main frame 1. This removable frame 11 is adapted to be applied to the main frame 1 for the purpose of adapting the same to the next smaller size of plate holder. In the present instance it may be assumed that the frame 11 is of such a size as to accommodate a 6½x8½ plate holder, the back of the frame being provided upon three sides thereof with a positioning rib 14, and upon the fourth side thereof with a groove 15 adapted to receive the usual rib at the outer end of the plate holder.

The opening of the removable frame 11 is rabbeted at the inner side thereof as indicated at 16 to receive the flange 17 of a second removable frame 18 which is of such a size as to receive a still smaller plate holder. One end of the frame 18 is provided with suitable shoes 19 adapted to fit under and engage the projecting ends of retaining fingers 20 upon the frame 11, while the opposite end of the frame 18 is provided with sliding latches 21 corresponding to the latches 13 of the frame 11 and adapted to engage suitable recesses in the frame 11. In the present instance it may be assumed that this second removable frame 18 is of such a size as to accommodate a 5x7 plate holder, the rear face of the said frame being provided upon three sides thereof with the positioning rib 22 and upon the fourth side thereof with the groove 23 adapted to receive the usual rib of the plate holder. In Fig. 1 a 4x5 plate holder is shown by dotted lines in the position assumed when about to be inserted in the camera back, while in Fig. 3 the position of the plate holder when applied to the camera back is indicated by dotted lines.

The opening of the second removable frame 18 is rabbeted at the inner face thereof as indicated at 24 to receive the flange 25 of a third removable frame 26, the said frame being adapted to receive a smaller size of plate holder than the before mentioned frame 18. One end of the frame 26 is provided with a shoe 27 adapted to fit under and engage the projecting end of a retaining finger 28 upon the frame 18, while the opposite end of the frame 26 is provided with sliding latches 29 similar to the latches 21 of the frame 18 and adapted to engage suitable recesses in the said frame 18. The construction of the latches 29 is shown more clearly by Fig. 4, and it will be observed that suitable means such as the pin and slot arrangement 30 is provided for limiting the sliding movement of the latches. This third removable frame 26 may be of such a size as to accommodate a 4x5 plate holder, the back of the frame being provided upon three sides thereof with the positioning rib 31 and upon the fourth side thereof with the usual groove 32 adapted to receive the rib at the outer end of the plate holder.

The ground glass frame 2 is slidably mounted within the channel bars 5 and can be properly adjusted so as to admit of access being readily had to the outer ends of the various sizes of plate holders for the purpose of removing and replacing slides thereof when making an exposure. A suitable latch member 37 is provided at one side of the ground glass frame 2, the said latch being adapted to engage any selected one of the notches 33, 34, 35 and 36 in the edge of the adjacent channel bar 5. When the camera back is employed in connection with the largest size of plate holder, in the present an 8x10 plate holder, the latch 32 is caused to engage the notch 33. Should the camera back be employed in connection with a 6½x8½ plate holder, the latch 37 would be brought into engagement with the notch 34, while for a 5x7 plate holder the latch would be caused to engage the notch 35, and for a 4x5 plate holder the latch would be caused to engage the notch 36. It will thus be obvious that the ground glass frame 2 is moved longitudinally when the smaller sizes of plate holders are employed so that the outer end portion of the plate holder will always be exposed a sufficient amount to admit of the operator withdrawing and replacing the slides of the plate holder in the usual manner without difficulty. It will be readily appreciated that without this provision for the longitudinal adjustment of the ground glass frame 2 it would be very difficult to withdraw the slides from the smaller sizes of plate holders without disturbing the position of the same.

In the operation of the device the nested frames 11, 17 and 26 can be assembled or removed as may be necessary to accommodate the desired size of plate holder, and the ground glass frame 2 then correspondingly adjusted in the channel bars 5. The camera is then ready to be used in the ordinary manner and the adjustment of the back does not interfere with the focusing of the camera or the usual manner of operating the same.

Having thus described the invention, what I claim as new and desire to secure by Letters Patent, is:—

1. An adaptable camera back including a series of nested frames adapted to be employed in connection with different sizes of plate holders, and a laterally adjustable clamping frame.

2. An adaptable camera back including a main frame, a series of removable flushly nested frames fitted within the main frame, each of the nested frames being provided at one side thereof with positioning means and at the opposite side thereof with a latch member, the various nested frames being adapted to be employed with different sizes of plate holders, and a slidably mounted clamping frame adapted to coöperate with the main frame and any selected one of the nested frames.

3. An adaptable camera back including a main frame provided with a rabbeted opening, a series of flanged frames nested within each other and the main frame, the flange of the largest nested frame engaging the rabbeted portion of the main frame while each of the other nested frames is rabbeted to receive the flange of the next smaller frame, the various frames being provided with positioning means for engaging different sizes of plate holders, latch means for retaining the nested frames in position, and a slidably mounted clamping frame adapted to be employed in connection with the main frame and a selected one of the nested frames.

4. An adaptable camera back including a main frame, a series of nested frames applied to the main frame and adapted to be employed in connection with different sizes of plate holders, channel bars having a yielding connection with the main frame, and a clamping frame slidably mounted between the channel bars.

5. An adaptable camera back including a main frame, a series of nested frames applied to the main frame and adapted to be employed in connection with different sizes of plate holders, channel bars having a yieldable connection with the main frame, a clamping frame slidably mounted between the channel bars, and means for locking the clamping frame in adjusted positions according to the size of plate holder which is being used.

6. An adaptable camera back including a main frame, a series of nested frames applied to the main frame and adapted to be employed in connection with different sizes of plate holders, a pair of guide bars yieldably connected to the main frame, and a clamping frame slidably mounted upon the guide bars and adapted to be adjusted upon the guide bars according to the size of plate holder which is being used.

7. An adaptable camera back including a main frame formed with a rabbeted opening, a series of flanged frames nested within each other and the main frame and each provided with positioning means for engaging a different size of plate holder, the flange of the larger nested frame being received within the rabbeted opening of the main frame while each of the larger nested frames is rabbeted to receive the flange of the next smaller frame, means for retaining the nested frames in position, a pair of guide bars having a yieldable connection to the main frame, and a clamping frame slidably mounted upon the guide bars and adapted to be adjusted thereon according to the size of plate holder being used.

In testimony whereof I hereunto affix my signature in the presence of two witnesses.

JOHN D. MEGOWN.

Witnesses:
AGNES A. JOHNSTON,
CHESTER M. BOYD.